United States Patent [19]

Velazquez

[11] Patent Number: 5,504,562
[45] Date of Patent: Apr. 2, 1996

[54] ELECTROSTATOGRAPHIC REPRODUCTION MACHINE HAVING A PLATEN COOLING COVER

[75] Inventor: Carlos A. Velazquez, Walworth, N.Y.

[73] Assignee: Xerox Corporation, Stamford, Conn.

[21] Appl. No.: 297,199

[22] Filed: Aug. 29, 1994

[51] Int. Cl.⁶ .................................................. G03G 21/00
[52] U.S. Cl. ....................................... 355/231; 355/75
[58] Field of Search ..................................... 355/230, 231, 355/30, 67, 75

[56] References Cited

U.S. PATENT DOCUMENTS

| 3,788,737 | 1/1974 | Kidd | 355/218 |
| 4,632,539 | 12/1986 | Temple | 355/30 |
| 4,945,383 | 7/1990 | Kobayashi et al. | 355/30 |
| 5,136,328 | 8/1992 | Gooray et al. | 355/30 |
| 5,172,159 | 12/1992 | Nakagama et al. | 355/30 |

FOREIGN PATENT DOCUMENTS 62-2245  1/1987  Japan.

*Primary Examiner*—Nestor R. Ramirez

[57] ABSTRACT

An electrostatographic reproduction machine including a cover assembly for holding an original document onto a glass platen, and for dissipating heat build up from the top of the glass platen. The cover assembly includes a heat conductive white film layer for contacting the original document, and a layer of foam with air flow passages therethrough mounted over the white film layer. The cover assembly also includes a rigid frame having a top panel including air flow openings formed therethrough, mounted over the layer of foam, for dissipating heat from the layer of foam and white film layer to the ambient.

14 Claims, 5 Drawing Sheets

5,504,562

ELECTROSTATOGRAPHIC REPRODUCTION MACHINE HAVING A PLATEN COOLING COVER

BACKGROUND OF THE INVENTION

This invention relates to electrostatographic reproduction machines that include original document illuminating means and transparent platens for holding original documents being illuminated for reproduction. More particularly, the present invention relates to such an electrostatographic reproduction machine having a cover that enables cooling of its transparent glass platen.

In conventional light lens or scanner type electrostatographic reproduction machines, an original document to be reproduced is manually placed or automatically conveyed onto a glass platen. The original document on the platen is illuminated by an elongate lamp assembly located in an optics cavity, either by moving the platen while the lamp is held stationary, or by moving the lamp assembly beneath a stationary platen. Alternatively, both the scan lamp and the platen can be held fixed and the document moved across the platen surface in a continuous velocity transport (CVT) mode.

In any of these cases, a problem to be anticipated is a buildup of heat at the platen from operation of the document illuminating lamps. The lamps used for document scanning, for example, are typically mercury fluorescent or tungsten halogen lamps. With either source, but particularly with the tungsten halogen type of lamp, the heat buildup at the platen can become a source of concern. For example, with continued usage, such a platen may become so hot as to present a safety concern for the machine operator or cause defects in the glass platen.

Various approaches therefore have been devised and disclosed, for example, in the following patents for glass platen cooling in electrostatographic reproduction machines.

U.S. Pat. No. 4,945,383 discloses an image forming apparatus which includes a temperature control device to control the temperature of light on a photosensitive medium. The apparatus is comprised of a pair of cooling fans and a heat ray reflecting shutter. The heat ray reflecting shutter aids in the ventilation created by the fans.

U.S. Pat. No. 4,632,539 discloses an apparatus for cooling a fluorescent lamp by causing a flow of cooling air to pass along a conduit extending along the length of the lamp.

U.S. Pat. No. 5,136,328 discloses a contoured scanning lamp reflector which entrains air flow underneath a platen glass and around the scanning lamp assembly for disturbing a boundary layer of heat thereof and cooling the lamp and platen.

Unfortunately, however, such conventional airflow devices which are located underneath the glass platen, are only partially effective because much of the heat from the document illuminating lamps reaches the glass platen through empty space as radiation. Radiant heat as such will pass through moving air which appear transparent to heat waves in the infrared range. Therefore, despite the use of air flow devices underneath the glass platen. The glass platen still builds up heat, particularly during long copy runs of a single original document when the cover of the machine is stationary and down over the document. The stationary cover which, in the clown position, serves to conform the document to the platen, traps heat over the platen, thus further heating the platen and raising its temperature.

SUMMARY OF THE INVENTION

A cover assembly for holding an original document onto a glass platen, and for dissipating heat build up from the top of the glass platen. The cover assembly includes a heat conductive white film layer for contacting the original document, and a layer of foam with air flow passages therethrough mounted over the white film layer. The cover assembly also includes a rigid frame having a top panel including air flow openings formed therethrough, mounted over the layer of foam, for dissipating heat from the layer of foam and white film layer to the ambient.

Other features of the present invention will become apparent from the following drawings and description.

BRIEF DESCRIPTION OF THE DRAWINGS

Other aspects of the present invention will become apparent as the following description proceeds and upon reference to the drawings, in which.

DETAILED DESCRIPTION OF THE INVENTION

Figure 1B:
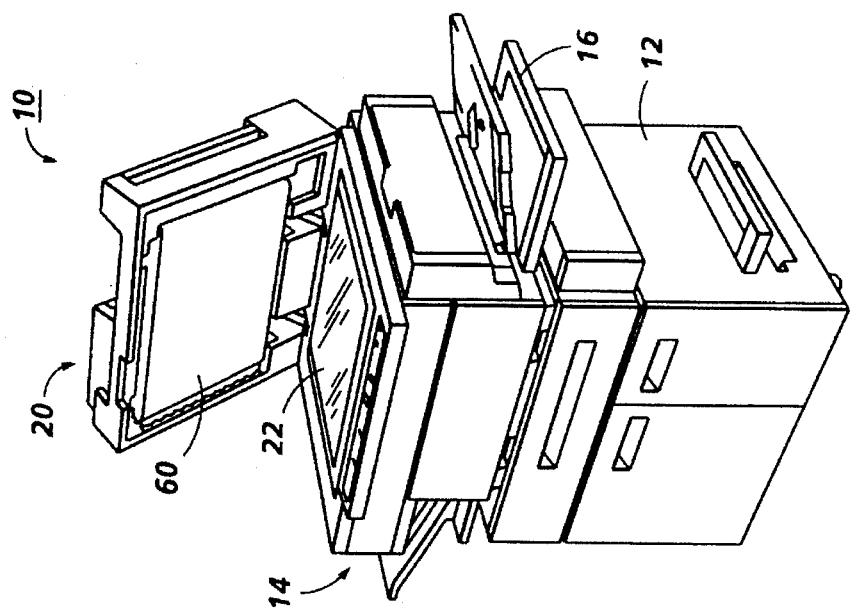
FIGS. 1A and 1B are perspective views of an exemplary electrostatographic reproduction machine showing the cover assembly according to the present invention in a closed and an open position, respectively.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to designate identical elements.

Figure 1A:
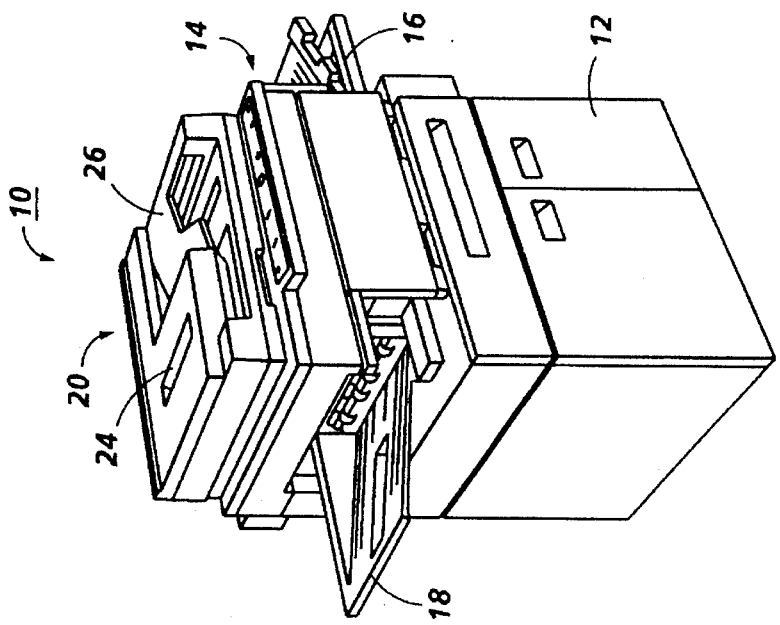

Referring now to FIGS. 1A and 1B, the electrostatographic reproduction machine of the present invention is shown generally as 10. The reproduction machine 10 includes a stand or base portion 12 and a main body 14. The main body 14 includes a paper supply 16, for example, and an output tray 18. Importantly, the main body 14 includes the cover assembly 20 of the present invention (to be described in detail below) which as shown is mounted pivotably over a glass platen 22.

As is well known, individual original documents to be reproduced can be placed manually on the glass platen 22 according to registration indicia, or as also illustrated they can be fed automatically in a registered manner onto the glass platen 22. For feeding sheets automatically as such, the cover assembly 22 of the present invention can include a single sheet feeding device section 24 for feeding one original document at a time, as well as a multi-sheet feeding device section 26 for feeding seriatim, one or more original documents automatically. In either the manual or automatic document feeding cases, as many copies of each original document can be made with the document on the platen glass 22 with the cover assembly 20 resting over it. It will become evident from the the following discussion that the cover assembly 20 is equally well suited for use in a wide variety of reproduction machines, and is not necessarily limited in its application only to the particular embodiments depicted herein.

Figure 2:
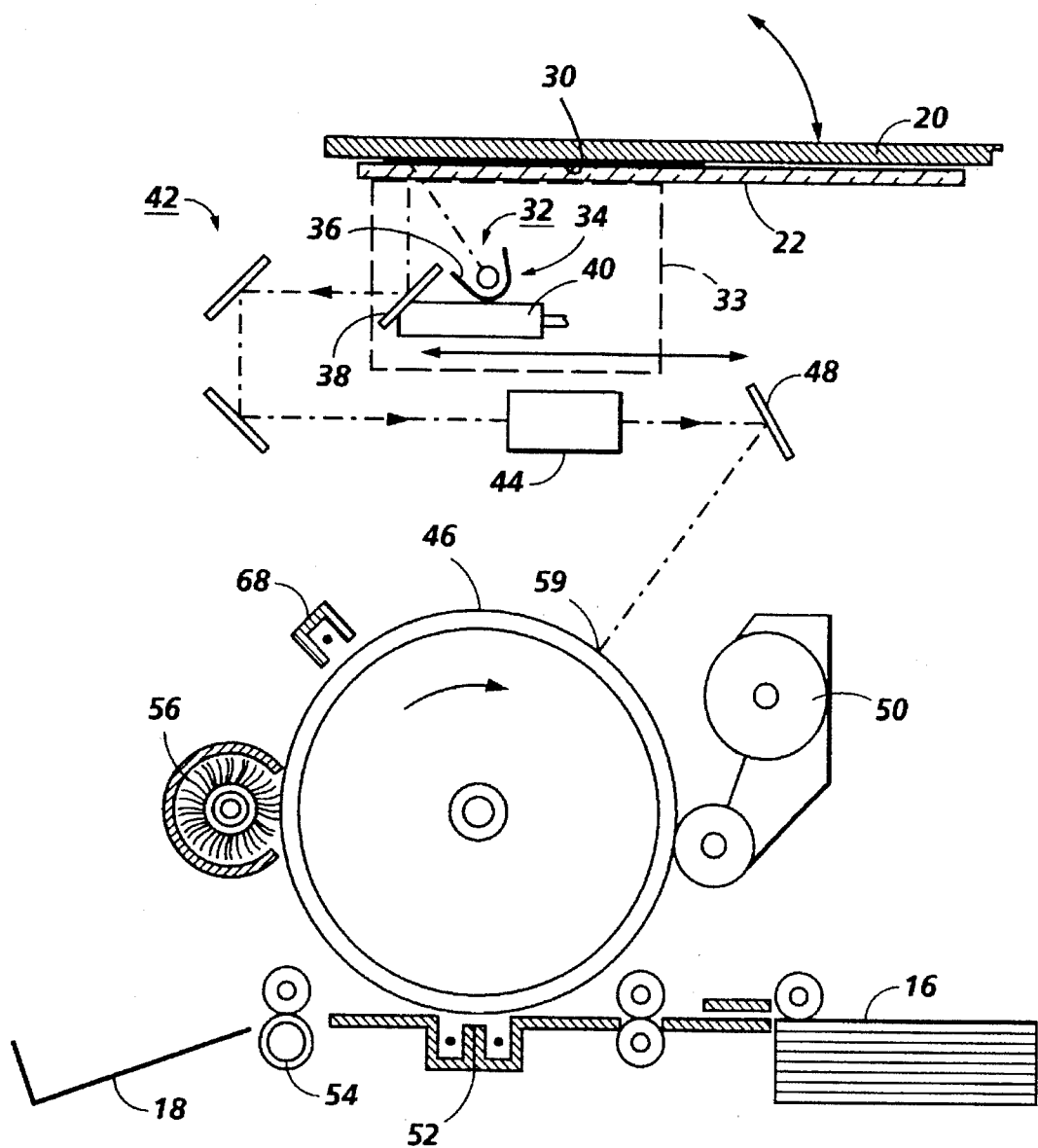
FIG. 2 is a side schematic view of the machine of FIGS. 1A and 1B incorporating the cover assembly of the present invention.

Referring now to FIG. 2 schematically, various elements of the reproduction machine 10 as depicted. Inasmuch as the art of electrostatographic reproduction is well known, the various processing stations employed in the FIG. 2 reproduction machine will be shown hereinafter only schematically, and their operation described only briefly with reference thereto. As illustrated, FIG. 2 is a side schematic view of a light lens document reproduction machine incorporating a tungsten halogen lamp as the document illuminator. It is understood that other types of illumination lamps may be used consistent with the principles of the present invention. As shown, an original document 30 to be copied is placed on the surface of the transparent glass platen 22. A scanning assembly 32 located within an optics cavity 33, consists of a tungsten halogen lamp 34, an associated reflector 36, and a scan mirror 38. Scanning assembly 32 is mounted for parallel movement along a scan path beneath and parallel to platen 22 on a scan carriage 40. A half-rate mirror assembly 42, adapted to travel on a ½ rate scan carriage (not shown) at ½ the rate of mirror 38, reflects line images of the document 30 into projection lens 44. Lens 44 projects a flowing image of the document 30 onto the surface of photoreceptive image bearing member drum 46 via drum mirror 48. Arranged around the photoreceptive drum 46 are conventional electrostatographic processing stations namely: a charging station 68 for applying a uniform charge to the photoreceptive drum surface, an exposure station 59 where a latent image of the original document is formed on the drum 46, a developing station 50 for applying a toner of suitable polarity to the latent image thus forming a toner image; a transfer station 52 for transferring the toner image to an output sheet; a fusing station 54 for fixing the transferred toner image to the copy sheet; and a cleaning station 56 for removing residual particles from the drum surface. In a document scanning mode, carriage 40 is driven on guide rails by conventional drive means, from left to right to incrementally scan document 30. At the end of one scan, the carriage is returned to the start of another scan position, and repeats. The entire document 30 can thus be imaged onto the charged surface of the photoreceptive drum 46 by such incremental repeated scanning. As is also known, the entire document 30 may also be imaged in a non-scanning optical machine embodiment merely by stationary repeated lamp flashes illuminating and exposing the surface of the drum 46 to the entire document 30 with each flash.

Figure 5:
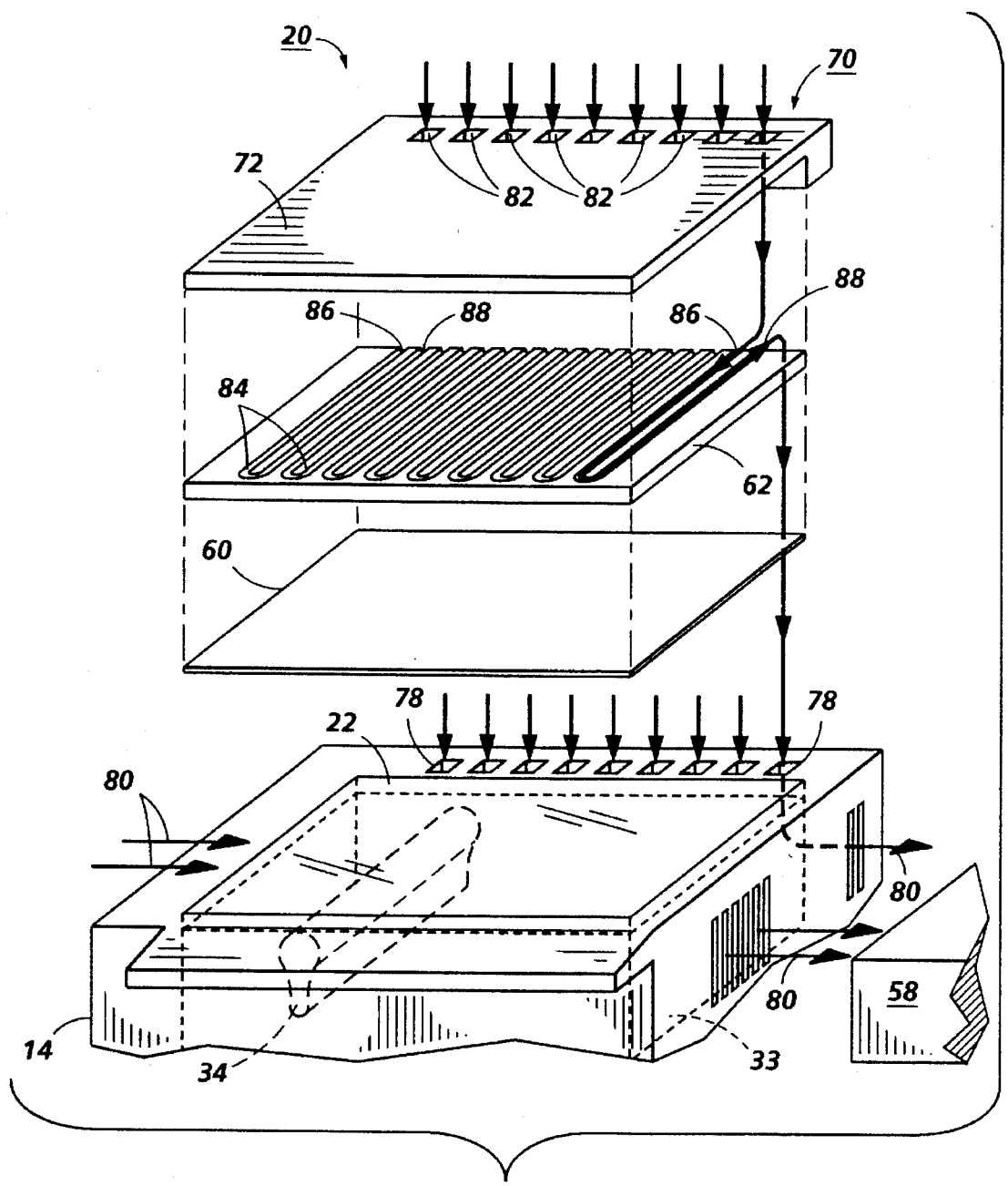
FIG. 5 is an exploded view of the platen assembly, and of a second embodiment of the cover assembly of FIG. 2.

During such repeated illumination of the document 30, heat generated by the lamp 34, in the absence of any heat reduction mechanism, ordinarily will result in heat build up in, and even in an overheating of the glass platen 22 through which the document 30 is repeatedly being illuminated. Such overheating might result in an unsafe condition for an operator, or possibly subject the glass platen 22 to stresses and eventual fractures. It has been found that such overheating can still result from heat trapped on the top of the glass platen 22 even when an airflow mechanism such as air blower 58 as shown FIG. 5, is provided underneath the glass platen 22 for exhausting air from the optics cavity 33.

It is believed that the foregoing description is sufficient for purposes of the present application to illustrate the general operation of an exemplary electrostatographic reproduction machine incorporating the features of the present invention therein.

Figure 3:
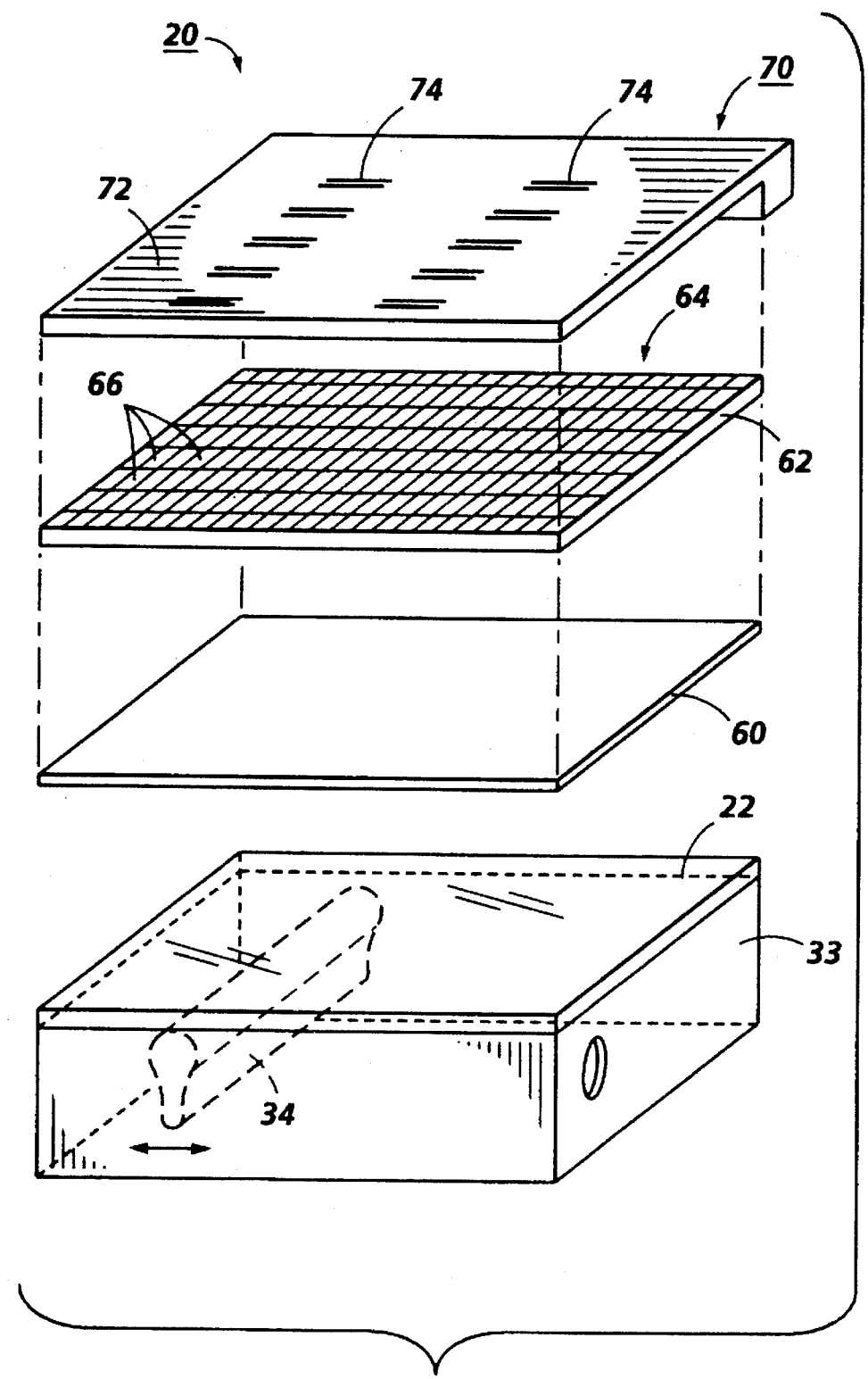
FIG. 3 is an exploded view of the platen assembly, and of a first embodiment of the cover assembly of FIG. 2.
Figure 4:
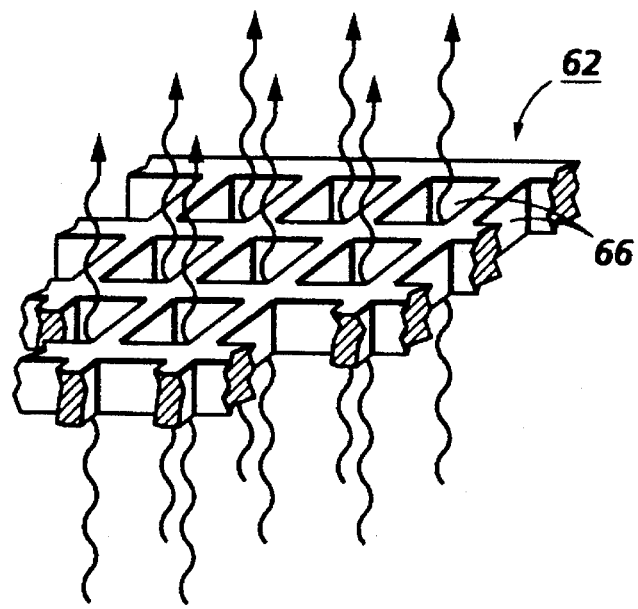
FIG. 4 is a detail of the cover assembly of FIG. 3.

Referring now to FIGS. 3 and 4, the optics cavity 33, the glass platen 22, and the cover assembly 20 of the present invention are illustrated in an exploded view. The purpose of the present invention is reducing the platen temperature by reducing the overall heat transfer resistance of the cover assembly 20, thereby increasing the heat flow from the top of the platen 22 to the ambient. Ordinarily, the cover assembly 20 on the platen 22 when down, acts to block the heat flux on the top surface of the platen. Heat is thus continuously accumulated or built up in the platen during long copy runs. Such heat build up is due in part to the high thermal resistance of thick conventional polyurethane foam that is attached within conventional cover assemblies for firmly supporting and conforming documents onto the platen 22. A forced air flow mechanism 58, for example, associated with the optics cavity 33 may help to reduce the platen temperature by moving some heat from the bottom surface or underneath side of the platen 22. However, heat which reaches the glass platen as radiation through even moving air continues to heat the platen resulting ordinarily in undesirable heat build up on the top side of the glass platen 22.

The cover assembly 20 of the present invention is designed to effectively dissipate heat build up from the top of the platen 22 therethrough and up into the ambient. According to a first embodiment of the present invention as illustrated in FIG. 3, the cover assembly 20 includes a heat conductive white film layer 60 for contacting and providing backing for a document positioned on the platen 22 to be illuminated. Preferably, the white film layer 60 is about 0.020" thick, and is comprised of a polycarbonate film for enabling acceptable heat conductivity therethrough, while still maintaining sufficient film stiffness in order to avoid warpping of the film. As illustrated in this embodiment, the cover assembly 20 does not include single or multi-sheet automatic feeding devices. However, it is understood that the heat dissipating features of the illustrated cover assembly 20 are equally applicable in an embodiment thereof including automatic sheet feeding devices. In such cases, the white film layer 60 will be provided in the shape of a continuous driven belt with suitable drive means.

As further shown, the cover assembly 20 also includes a layer of foam 62. Conventional cover assemblies typically have a high insulation value due to the use of thick foam layers for the purpose of conforming documents to the shape of the platen 22. Such thick layers of foam however have been found to act as insulation, thus trapping heat on top of the platen and undesirably resulting in high glass platen temperatures. According to the present invention however, the layer of foam 62 is relatively thinner, and is intended to reduce the platen temperature by increasing the heat transfer resistance thereof. The layer of foam 62 is attached as by gluing on top of the white film layer 60. The layer of foam 62 of the present invention includes heat dissipating means such as air flow passages 64 machined therethrough. The air flow passages 64 in the first embodiment of the cover assembly 20, for example are holes 66 (FIG. 4). The holes 66 are formed as a repeated pattern, and are circular. They are produced, for example, by punching, thus leaving the piece of foam to be attached or mounted over the white film layer 60, as an integral piece. The holes 66 are formed so that heat conducted by the white film layer 60 away from the top of the platen 22, will be dissipated upwards principally by convection through such holes.

According to the present invention, the heat dissipating ability of the layer of foam 62 is preferably enhanced by making the layer 62 out of a thermally conductive foam such as silicone sponge foam.

As also shown, the cover assembly 20 further includes a rigid frame 70 that has a top generally solid panel 72. The top panel 72 is mounted on top of the layer of foam 62, and an edge of the rigid frame 70 is ordinarily mounted to a top edge of the reproduction (FIG. 1B) for pivotable movement relative to the top of the platen 22. Although shown as a simple manual cover, the rigid frame 70 and top panel 72 could equally be those including automatic sheet feeding devices (FIG. 1A). In either case, the top panel 72 of the rigid frame 70 includes heat dissipating means formed therein as vents or air flow openings 74. The vents or air flow passages 74 which open from the bottom surface of the top panel 72 to the ambient serve to relase, by convection, hot air and heat from the layer of foam 62. As shown more clearly in FIG. 3B, the vents or air flow openings 74 are formed facing front to back, and have a size each so as to prevent an operator from accidentally getting a finger, for example, caught in one of the openings. However, the openings 74 are suitable for effecting air exchange between the ambient and the layer of foam 62 as mounted beneath the top panel 72. As disclosed in FIGS. 3 and 4, the cover assembly 20 is suitable for dissipating heat naturally by conduction and convection from the top of the platen 22 to the ambient. The idea is to transport the accummulated heat in the platen 22 by conduction through the white film layer, by natural convection through the layer of foam using the passages 66, and finally by convection again through the air flow openings 74 in the top panel 72, into the ambient.

Figure 6:
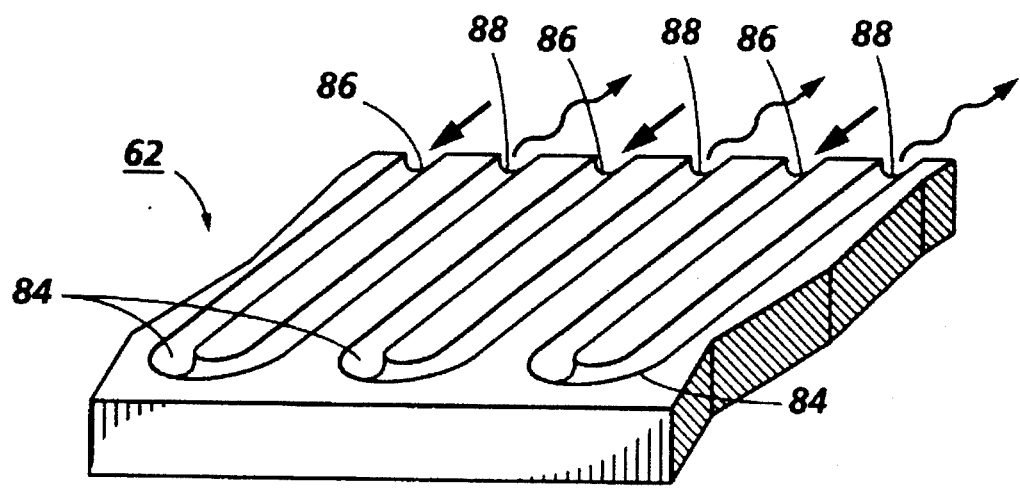
FIG. 6 is a detail of the cover assembly of FIG. 5.

Referring now to FIGS. 5 and 6, a second embodiment of the cover assembly 20 of the present invention is illustrated for use in conjunction with a forced air flow mechanism within the reproduction machine. In this illustration, like numerals represent like elements as in the first embodiment of FIGS. 3 and 4. As shown, the white film layer 60 is the same as in this embodiment as it is in the first embodiment. However, the heat dissipating features of the layer of foam 62 and of the rigid frame 70 have been modified to cooperate with the forced air flow system of the reproduction machine 10.

As shown, the forced air flow system of the reproduction machine 10 includes a blower mechanism 58 (FIG. 5). It also includes a series of air outlet openings 78 that are formed and air sealed through a top edge of the reproduction machine 10, adjacent the platen 22. The outlet openings 78 are formed so as to be in communication with a forced airstream 80 moving underneath the platen 22 due to the blower mechanism 58. As such, hot air from the region above the platen 22 including the cover assembly 20 of the present invention can be pulled through the outlet openings 78 into the airstream 80, thereby cooling to top of the platen 22.

As further shown, rigid frame 71 of the second embodiment of cover assembly 20 includes a series of air flow openings in the form of air inlet openings 82 that are formed along an edge thereof so as to correspond and communicate through the layer of foam 62 with the outlet openings 78. Referring, in particular, to FIGS. 5 and 6, the layer of foam 62 has formed partially into its upper surface, facing the top panel 72 and inlet openings 82, a series of horse-shoe shaped air flow channels 84, each with first and second open ends 86, 88, respectively. Additionally, the foam layer 62 may consist of one entire piece of foam with such two dimensional horse-shoe shaped channels formed therein, along with a series of through openings for bottom to top surface convective heat flow. In order to cause ambient air pulled through the inlet openings 82 to circulate through a major area of the layer of foam 62, the first open end 86 of each horse-shoe channel is aligned with an inlet opening 82, and the second open end 88 is aligned with an outlet opening 78.

In operation, heat build up underneath the platen 22 is removed conventionally by an air blower such as the mechanism 58 (FIG. 5). In addition, heat build up on the top of the platen 22 is dissipated by conduction through the white film layer 60 and through the layer of foam 62. Such heat is then dissipated from the top part of the layer of foam 62 by forced air drawn therethrough by the blower mechanism 58 into and out the outlet openings 78. In other words, fresh air from the ambient is caused to circulate on the platen top surface thereby taking heat with it by convection.

It is, therefore, apparent that there has been provided in accordance with the present invention, a cover assembly for an electrostatographic reproduction machine for effectively coding the glass platen of the machine by dissipating heat from the top of such a platen. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A cover assembly for use on an electrostatographic reproduction machine including a glass platen for holding an original document being reproduced, and original document illuminating means mounted in an optics cavity underneath the glass platen, the cover assembly comprising:
   (a) a white film layer for positioning an original document in contact with the platen;
   (b) a layer of foam mounted on top of said white film layer;
   (c) a rigid frame including a top panel attached to said layer of foam for mounting over the platen; and
   (d) heat dissipating means formed in said layer of foam and in said rigid frame, for dissipating heat from a top surface of the platen, thereby cooling the platen.

2. The cover assembly of claim 1, wherein said white film layer is thermally conductive.

3. The cover assembly of claim 1, wherein said heat dissipating means formed in said layer of foam comprises air flow passages machined therethrough.

4. The cover assembly of claim 1, wherein said heat dissipating means formed in said rigid frame comprises air flow openings formed through said top panel thereof for air exchange between an ambient area and said layer of foam beneath said top panel.

5. The cover assembly of claim 2, wherein said white film layer is comprised of a polycarbonate film.

6. The cover assembly of claim 3, wherein said layer of foam comprises silicone sponge foam for increasing heat dissipation therethrough by conduction.

7. The cover assembly of claim 3, wherein said air flow passages machined through said layer of foam comprise a repeated pattern of circular holes for air to flow from said white film layer to said rigid frame.

8. The cover assembly of claim 4, wherein said air flow openings machined through said layer of foam are comprised of a series of horse-shoe shaped channels machined partially into a surface of said layer of foam.

9. The cover assembly of claim 8, wherein each said horse-shoe shaped channel includes an open first end aligned with one said air flow openings formed in said top panel.

10. The cover assembly of claim 9, wherein each said horse-shoe shaped channel includes an open second end aligned with an air outlet opening formed through an edge of the platen.

11. An electrostatographic reproduction machine including:
   (a) an optics cavity;
   (b) a glass platen mounted over said optics cavity for holding an original document being reproduced;
   (c) document illuminating lamps located within said optics cavity for illuminating an original document on said glass platen; and
   (d) a cover assembly for holding an original document on said glass platen and for dissipating heat from the top of said glass platen, the cover assembly including:
      (i) a heat conductive white film layer for contacting the original document;
      (ii) a layer of foam mounted on top of said white film layer; and
      (iii) a rigid frame including a top panel mounted over said layer of foam and over said white film layer, said top panel of said rigid frame including air flow openings for exchanging heated air from the top of said glass platen with ambient fresh air.

12. The electrostatographic reproduction machine of claim 11, including an air blower mechanism for creating forced air movement underneath said glass platen.

13. The electrostatographic reproduction machine of claim 12, including air outlet openings formed through a top edge thereof for exhausting air from the top of said glass platen into said forced air movement created underneath said glass platen.

14. The electrostatographic reproduction machine of claim 13, wherein said layer of foam is comprised of thermally conductive silicone sponge foam for conducting heat from the top of said glass platen into horse-shoe shaped channels.

* * * * *